(12) United States Patent
Barnum (10) Patent No.: US 9,598,665 B1
(45) Date of Patent: Mar. 21, 2017

(54) RACKING ARM TANK OUTLET PORT

(71) Applicant: Thomas A. Barnum, Newcastle, CA (US)

(72) Inventor: Thomas A. Barnum, Newcastle, CA (US)

( * ) Notice: Subject to any disclaimer, the term of this patent is extended or adjusted under 35 U.S.C. 154(b) by 851 days.

(21) Appl. No.: 13/944,609

(22) Filed: Jul. 17, 2013

Related U.S. Application Data (60) Provisional application No. 61/741,465, filed on Jul. 19, 2012.

(51) Int. Cl.
  *C12C 13/10* (2006.01)
  *F16L 23/16* (2006.01)
  *C12C 11/00* (2006.01)
  *C12G 1/036* (2006.01)

(52) U.S. Cl.
  CPC ............ *C12C 13/10* (2013.01); *C12C 11/006* (2013.01); *C12G 1/0206* (2013.01); *F16L 23/167* (2013.01)

(58) Field of Classification Search
  CPC ..... F16L 5/00; F16L 5/02; F16L 5/025; F16L 5/08; F16L 5/14; F16L 5/022; F16L 5/027; F16L 5/04; F16L 5/06; F16L 5/10; F16L 5/12; F16L 41/08; F16L 41/086; F16L 41/12; F16L 41/16; F16L 2201/30; B65D 90/02; B65D 25/005; C12M 23/02; C12M 23/06; C12G 1/0206; C12C 11/006; C12C 11/075; C12C 13/10; C12H 1/22; F17C 2205/0305
  USPC ...................... 285/38; 220/661; 222/526, 537
  See application file for complete search history.

(56) References Cited

U.S. PATENT DOCUMENTS

| | | | | | |
|---|---|---|---|---|---|
| 2,136,474 | A | * | 11/1938 | Straty | F17C 1/04 |
| | | | | | 220/62.17 |
| 3,328,054 | A | * | 6/1967 | Fecho | F16L 5/00 |
| | | | | | 285/194 |
| 3,485,516 | A | * | 12/1969 | Kell | F16L 23/12 |
| | | | | | 285/123.1 |
| 4,094,343 | A | * | 6/1978 | Koreska | F16L 21/00 |
| | | | | | 141/392 |
| 5,906,151 | A | * | 5/1999 | Firestone | C12H 1/22 |
| | | | | | 426/11 |

(Continued)

OTHER PUBLICATIONS http://Web.archive.org/web/201301010000000/http://barnurn rnech.corn/products/racki ng-arrn s/.*

(Continued)

*Primary Examiner* — James Hewitt
(74) *Attorney, Agent, or Firm* — Heisler & Associates (57) ABSTRACT

The racking arm includes a housing affixable to a tank side wall. A racking shaft extends through the housing with an inlet pipe coupled to an inside end of the racking shaft, with an entrance offset from a rotational axis of the racking shaft. A control arm is affixed to the racking shaft and can be rotated to cause rotation of the racking shaft relative to the housing and to change the entrance to different elevations within the tank. A clearance groove surrounds the inside end of the racking shaft to facilitate cleaning of the inside end of the racking shaft. The arm can interface with an indexing plate to hold the racking shaft fixed with the arm indicating by its position the orientation of the entrance. At least one leak detection port extends through the housing to indicate whether fluid is leaking between the racking shaft and housing.

24 Claims, 8 Drawing Sheets

(56) References Cited

U.S. PATENT DOCUMENTS

| | | | | |
|---|---|---|---|---|
| 6,299,216 B1 * | 10/2001 | Thompson | ............ | F16L 23/167 |
| | | | | 277/318 |
| 6,318,581 B1 * | 11/2001 | Garton | ................ | B65D 90/24 |
| | | | | 220/4.12 |
| 2002/0031822 A1 * | 3/2002 | van der Wel | ........... | B01F 7/302 |
| | | | | 435/289.1 |
| 2006/0273224 A1 * | 12/2006 | Hoffjann | ................ | F16L 5/08 |
| | | | | 244/136 |
| 2011/0114651 A1 * | 5/2011 | Oltman | .................... | F16L 5/08 |
| | | | | 220/661 |

OTHER PUBLICATIONS http://brau.rolshoven.com/bilder/tabec/tabec_fin_5.jpg.*
1/22656d1301232896-brewhemoth-conicals-brewhemoth2.jpg.*

* cited by examiner

RACKING ARM TANK OUTLET PORT

CROSS-REFERENCE TO RELATED APPLICATIONS

This application claims benefit under Title 35, United States Code §119(e) of U.S. Provisional Application No. 61/741,465 filed on Jul. 19, 2012.

FIELD OF THE INVENTION

The following invention relates to fluid holding tank outlet ports and valves. More particularly, this invention relates to racking arm type tank outlet ports which have an inlet pipe with an offset entrance and the inlet pipe can be rotated relative to the tank so that liquids can be removed from the tank at different elevations within the tank by rotation of the inlet pipe to a desired position.

BACKGROUND OF THE INVENTION

Industrial processes involving liquids typically require large liquid storage tanks as one element in such systems. For instance, in food and agricultural processing large liquid storage tanks are often involved to store liquids. Examples include olive oil, or grape juice that is being processed into wine.

Removal of liquids from such large liquid storage tanks often involves a known prior art outlet system known as a "racking arm" tank outlet. A racking arm adds an elongate inlet pipe to a basic valve fitted to a side wall of the tank. This inlet pipe extends into an interior of the liquid storage tank. This elongate inlet pipe has a bend in it so that an entrance of the inlet pipe is spaced away from a central axis of the inlet pipe where it passes through the tank wall. The inlet pipe is mounted to the tank wall in a manner that allows rotation of the inlet pipe, and typically also the valve, relative to the tank wall. When this inlet pipe is rotated, the entrance of the inlet pipe can be adjusted in elevation so that liquids being discharged from the tank can be selectively removed at different elevations within the tank.

Depending on the needs of the operator, the racking arm has the entrance of the inlet pipe positioned where desired within the tank and then the valve is opened to discharge liquid from the desired elevation level of the tank. For instance, an operator might wish to withdraw liquid from near a surface of liquid within the tank, but below this surface to avoid capturing any floating matter. The racking arm can be rotated to place the entrance of the inlet pipe near (but just below) this surface. Similarly, the racking arm can be rotated to be just above sediment near a bottom of the tank. As the amount of liquid within the tank decreases, the racking arm can be rotated to lower the entrance of the inlet pipe to keep it just below the surface.

Numerous problems exist with existing racking arms. Racking arms provide a variety of different loads on the tank wall, depending on the orientation of the racking arm. Because liquid tank design is often optimized to minimize the quantity of material required, the tank wall can be damaged due to these forces exerted by the racking arm upon the tank wall. Also, it can be difficult to know what the orientation of the entrance of the racking arm is when an operator is standing outside of the liquid storage tank. Furthermore, racking arms can be susceptible to leakage if not properly designed. Finally, when handling food grade materials, it is important that the liquid storage tank, and all of the surfaces of the racking arm and associated valves which come into contact with consumable liquids, be sufficiently cleanable to meet desired levels of cleanability and sanitization.

SUMMARY OF THE INVENTION

This invention is directed to an improved racking arm tank outlet port which addresses deficiencies in racking arms known in the prior art to provide a reliable, easy to operate and fully cleanable and sanitizable racking arm. The racking arm of this invention generally includes a housing assembly which is affixed to the tank wall and a racking shaft assembly which fits within the housing, and extends through the housing from an interior location including the inlet pipe to an outlet location with a valve and outlet thereon. The entire racking shaft assembly is rotatable relative to the housing assembly, about a rotational axis (other than an outlet which can be clamped to the racking shaft through a swivel joint to keep the outlet from rotating and twisting downstream conduits).

While the housing assembly is primarily shown herein including separate parts joined together, such as through welding, the housing can also be formed as a single assembly from a unitary mass of material. The housing generally includes a cylindrical body with a pair of plates at ends thereof, including a face plate and an end plate. The face plate is configured to be attachable to a tank flange, such as through bolting together in a parallel fashion. The face plate and tank flange can together form at least one flange on an end of the housing in one form of the invention.

The tank flange is preferably a separate structure from the housing, but remains fixed to the housing during operation of the racking arm of this invention. The tank flange is affixed to the wall of the liquid storage tank, such as by cutting a hole in the tank wall and welding the tank flange into the tank wall. Typically, it is beneficial to reinforce the tank wall as part of this tank flange attachment process. For instance, a doubler plate of strengthening material can be attached to the tank wall around a location where the tank flange is to be attached, and then the tank flange is attached to this doubler plate, and potentially also to the tank wall, for secure attachment of the tank flange to the tank wall and reinforcement of the tank wall adjacent the tank flange. Such wall preparation also preferably modifies the contour of the tank wall from a slightly curving cylindrical section to substantially planar.

With the face plate bolted or otherwise attached to the tank flange, the body of the housing preferably extends substantially perpendicularly, and typically horizontally, away from the tank wall. The end plate of the housing defines an end of the housing most distant from the tank and tank flange. An indexing plate is preferably bolted or otherwise attached to this end plate. The indexing plate has a perimeter with holes therein which can receive an indexing pin or other indexing structure in various different positions depending on the orientation of the racking shaft and other portions of the racking shaft assembly relative to the housing. In the embodiment shown, the indexing plate has sixteen holes evenly spaced radially about a center point of the indexing plate and located equal distances inboard of a circumferential edge of the indexing plate. As an alternative, different numbers of holes and different hole positions could be provided in the indexing plate.

The racking shaft is preferably an elongate tubular structure which has an inner end which is coupled to the inlet pipe which includes an angular bend and extends to an entrance within the tank. An outer end of the racking shaft is typically securely coupled to a valve and in turn securely coupled to an outlet for discharge of liquids from the tank. The racking shaft is supported within an interior of the housing to allow the racking shaft and associated portions of the racking shaft assembly to rotate together about a rotational axis aligned with a centerline of the body of the housing. A control arm is affixed to the racking shaft adjacent to the indexing plate. The control arm includes an indexing pin thereon which can be selectively translated into and out of different pin holes in the indexing plate to secure the control arm, and in turn the racking shaft, relative to the housing.

Beneficial features of this invention are described herein as follows, in an exemplary form of this invention. The control arm is preferably affixed to the racking shaft in an orientation which is aligned with the inlet pipe of the racking shaft within the tank. In this way, and because the control arm is significantly longer than the indexing plate and other portions of the housing, a user can quickly determine the orientation of the inlet pipe of the racking arm by visually observing the orientation of the control arm. If the control arm is pointed up, the inlet pipe is extending upward to a highest position for the entrance. If the control arm is pointed down, the inlet pipe is at a lowest position for the entrance within the tank. Preferably, the control arm is keyed to the racking shaft in such a fashion that the control arm cannot be dislodged radially away from this position aligned with the inlet pipe of the racking arm.

The racking shaft assembly and the housing assembly are preferably configured modularly so that different portions of the assembly can be disassembled for inspection and maintenance without requiring complete removal of the racking arm from the tank.

The tank flange and preferably also the face plate of the housing include a clearance groove therein. This clearance groove spaces portions of the tank flange and face plate of the housing away from portions of the racking shaft within the tank. In this way, an outer surface of the inside end of the racking shaft can be readily cleaned as well as surfaces of this clearance groove in the faceplate and the tank flange. In this preferred embodiment this clearance groove is a frusto-conical surface and has an angle of about 35° away from horizontal. In other embodiments the angle could be form about 30° to about 60°.

Preferably, the clearance groove extends into the face plate of the housing at a constant and common angle for each port. Because the face plate and tank flange are securely attached together, a tight seal is provided between the face plate and tank flange which will not collect debris. This clearance groove extends substantially up to a location of a first seal between the racking shaft and the body of the housing. A bearing is provided behind this seal to keep the racking shaft centrally aligned within the body of the housing. A secondary seal is preferably provided behind this bearing. The clearance groove allows cleaning substantially right up to this first seal so that debris can be cleaned out and a sanitary environment within the liquid storage tank can be maintained. A large bearing sleeve is provided inboard of the body and more distant from the face plate and tank flange than the second seal. This sleeve further assists in maintaining general coaxial alignment of the racking shaft within the body of the housing.

Beneficially with this invention, a leak detect port is provided passing through the body of the housing between the sleeve and the seal most distant from the face plate. If liquid is passing through the leak detect port, this indicates that the seals are not operating properly and that maintenance on the racking arm is warranted. In one embodiment, a secondary leak detect port location can be provided between the two seals so that further information as to the operation of the seal closest to the face plate can be evaluated. A bronze bushing is also preferably provided between the indexing plate and a collar holding the control arm to the racking shaft. This bronze bushing acts as a form of thrust bearing and wear plate and further assists in maintaining alignment of the racking shaft assembly relative to the housing assembly.

The entire inner surface of the racking shaft is a smooth cylindrical structure which is readily cleanable and does not include any steps or transitions where debris might accumulate. In this way, the entire racking shaft interior can also be readily cleaned and sanitized.

OBJECTS OF THE INVENTION

Accordingly, a primary object of the present invention is to provide a racking arm inside of the tank with utilization of a clearance groove at an interface between a racking shaft of the racking arm and a housing of the racking arm.

Another object of the present invention is to provide a racking arm tank outlet which has a control arm to assist in rotating of the racking arm, which control arm is oriented in alignment with an inlet pipe of the racking arm so that the control arm indicates an orientation of the racking arm.

Another object of the present invention is to provide a racking arm tank outlet which includes at least one leak detection port which drips fluid when the racking arm is leaking fluid into a gap between the racking shaft and the housing.

Another object of the present invention is to provide a racking arm apparatus which is of modular construction and can be largely disassembled in pieces for inspection and repair.

Another object of the present invention is to provide a racking arm tank outlet port which can be readily attached to a side wall of a fluid holding tank.

Another object of the present invention is to provide a racking arm which minimizes forces transmitted to a side wall of a fluid tank during operation of the racking arm.

Another object of the present invention is to provide a racking arm which rotates relative to a tank wall but has a swivel joint at an outlet to keep downstream conduits from twisting.

Other further objects of the present invention will become apparent from a careful reading of the included drawing figures, the claims and detailed description of the invention.

DESCRIPTION OF THE PREFERRED EMBODIMENT

Figures 1, 2:
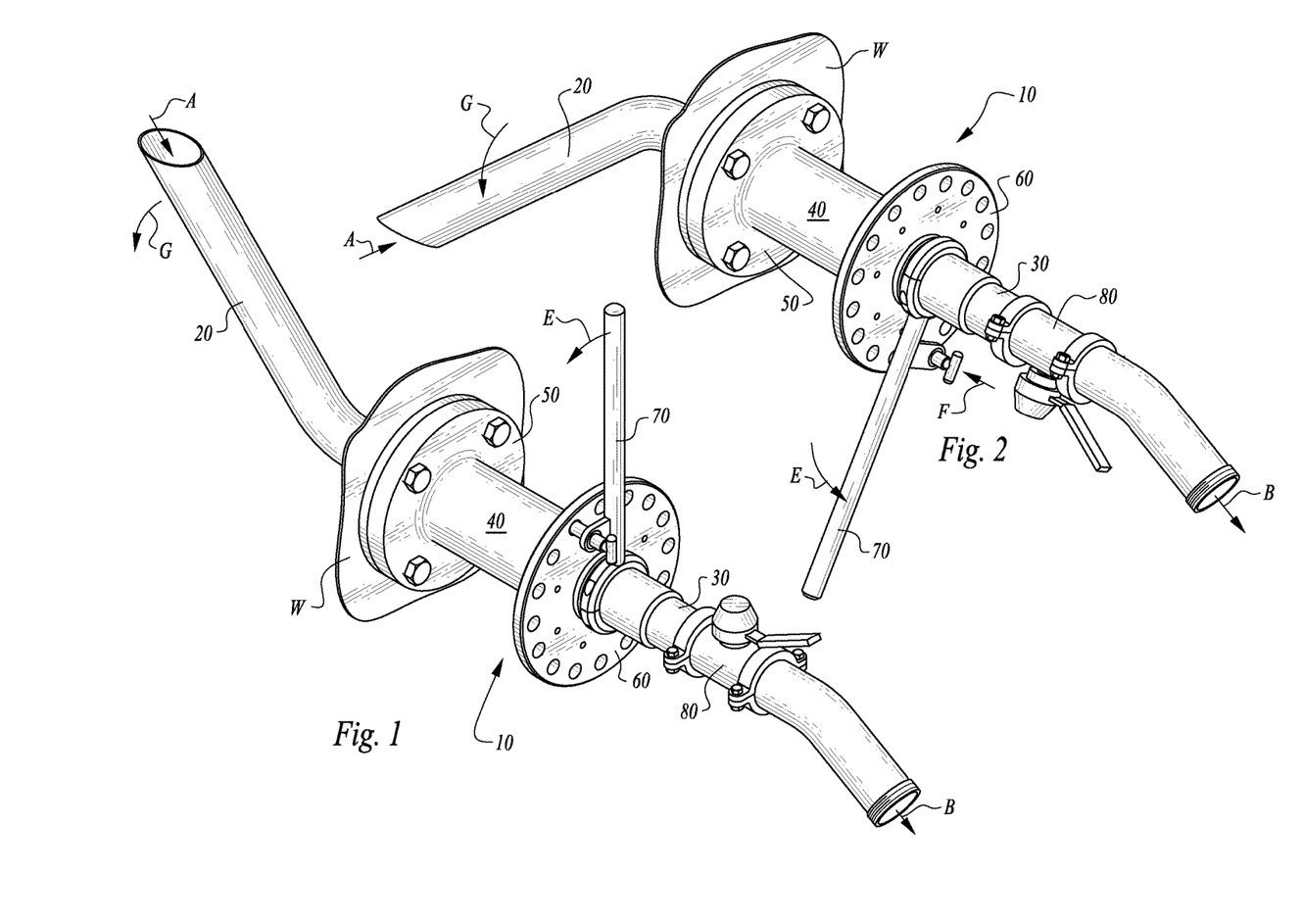
FIG. 1 is a perspective view of the racking arm of this invention with portions of the tank side wall cut away and illustrating how fluids flow into and out of the racking arm and how the racking arm can rotate.
FIG. 2 is a perspective view similar to that which is shown in FIG. 1, but after rotation of the control arm and associated inlet pipe to a second position relative to the position shown in FIG. 1, but with the outlet rotated about a swivel joint to avoid rotation of downstream equipment.

Referring to the drawings, wherein like reference numerals represent like parts throughout the various drawing figures, reference numeral 10 (FIGS. 1-4) is directed to a racking arm for providing an outlet port from a tank. The racking arm 10 is mounted to a side tank wall W and facilitates discharge of fluids from the tank at different elevations within the tank. The racking arm 10 can rotate (along arrow G of FIGS. 1-3) to draw fluids at different elevations (along arrow A of FIGS. 1-4) from within the tank and then discharge those fluids (along arrow B of FIGS. 1-4). FIG. 1 depicts fluid removal from a higher elevation within the tank and FIG. 2 illustrates fluid removal from a lower elevation within the tank.

Figure 3:
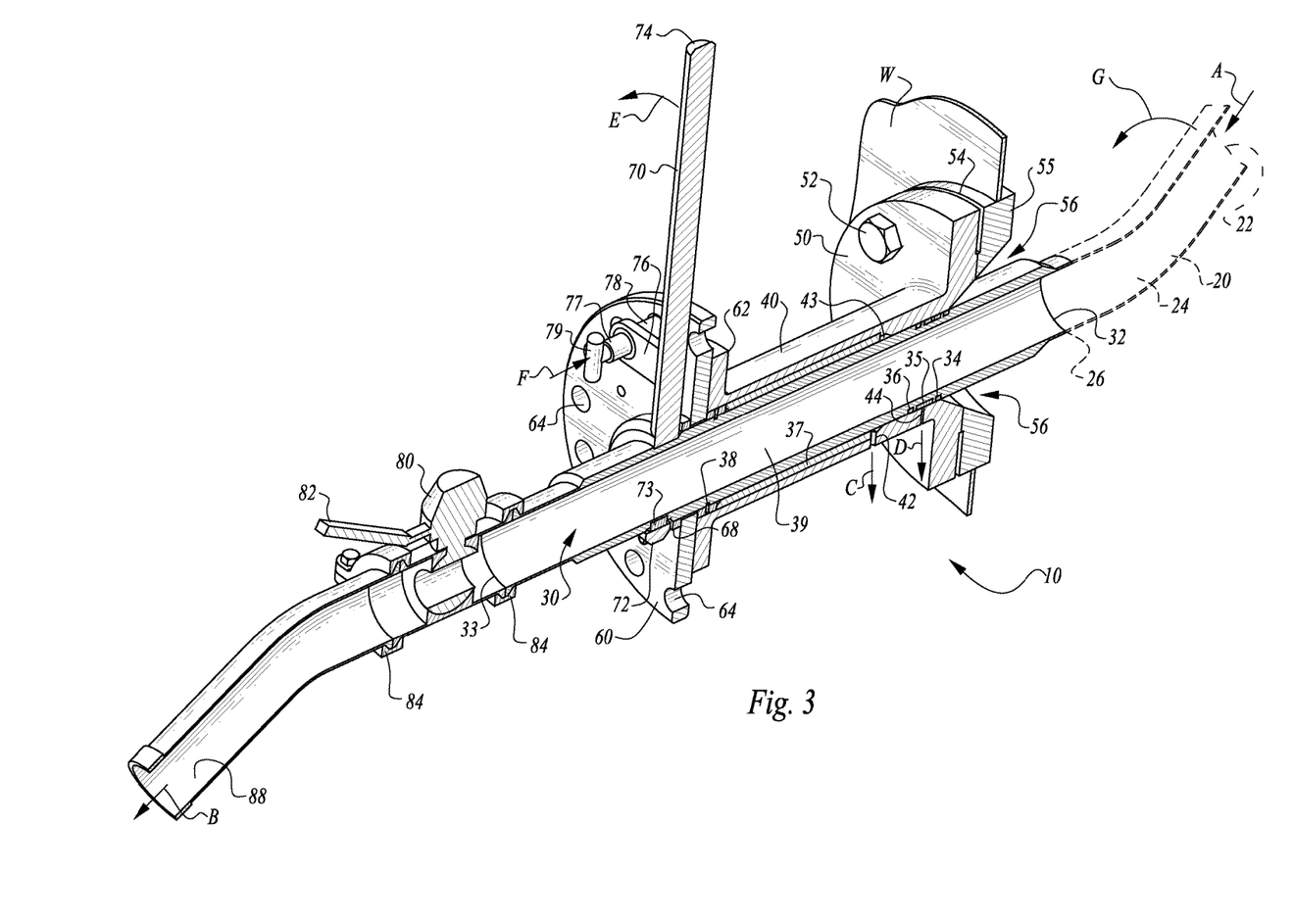
FIG. 3 is a full sectional perspective view of the racking arm of this invention and in the orientation shown in FIG. 1.
Figure 4:
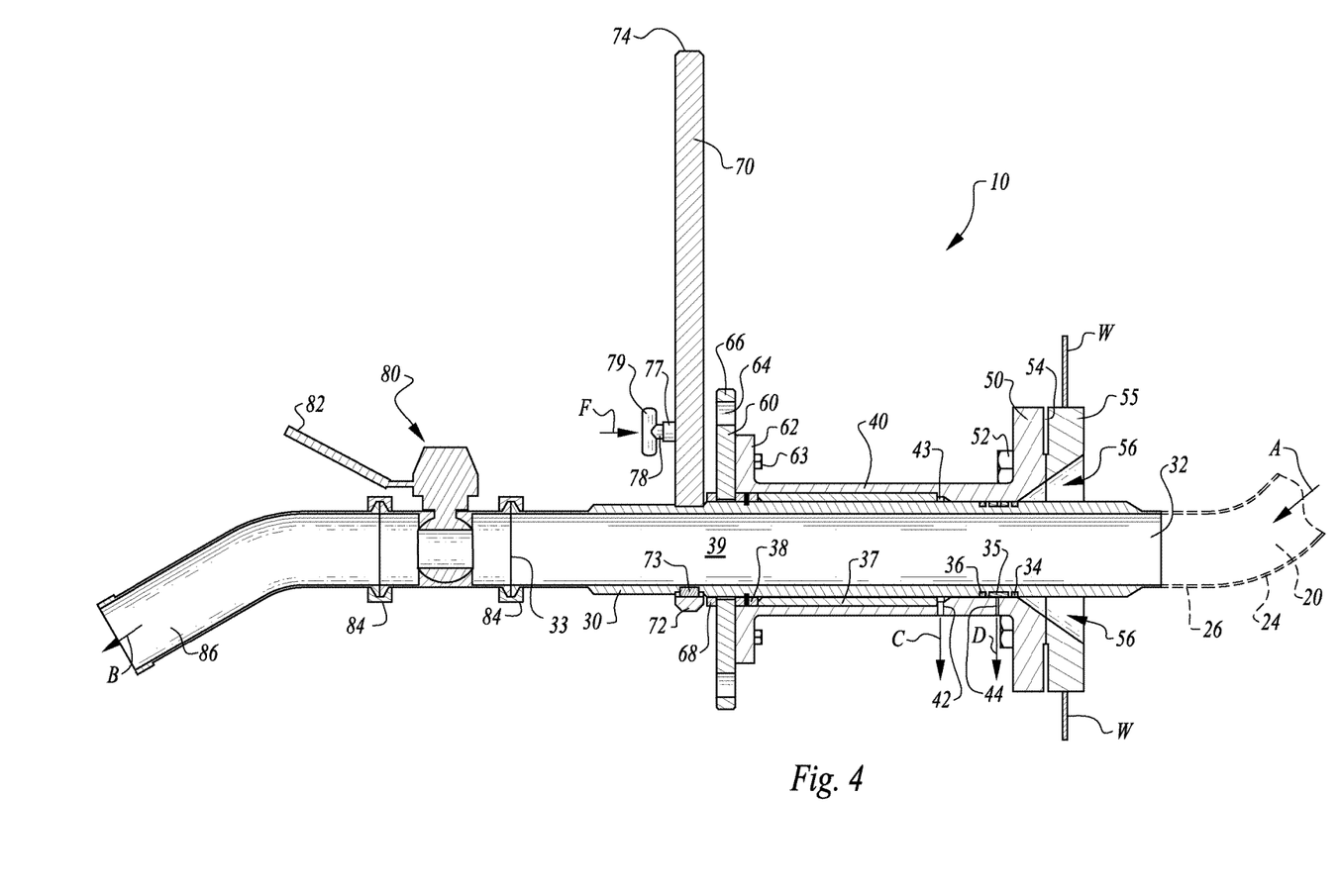
FIG. 4 is a side elevation full sectional view of that which is shown in FIG. 3.
Figure 6:
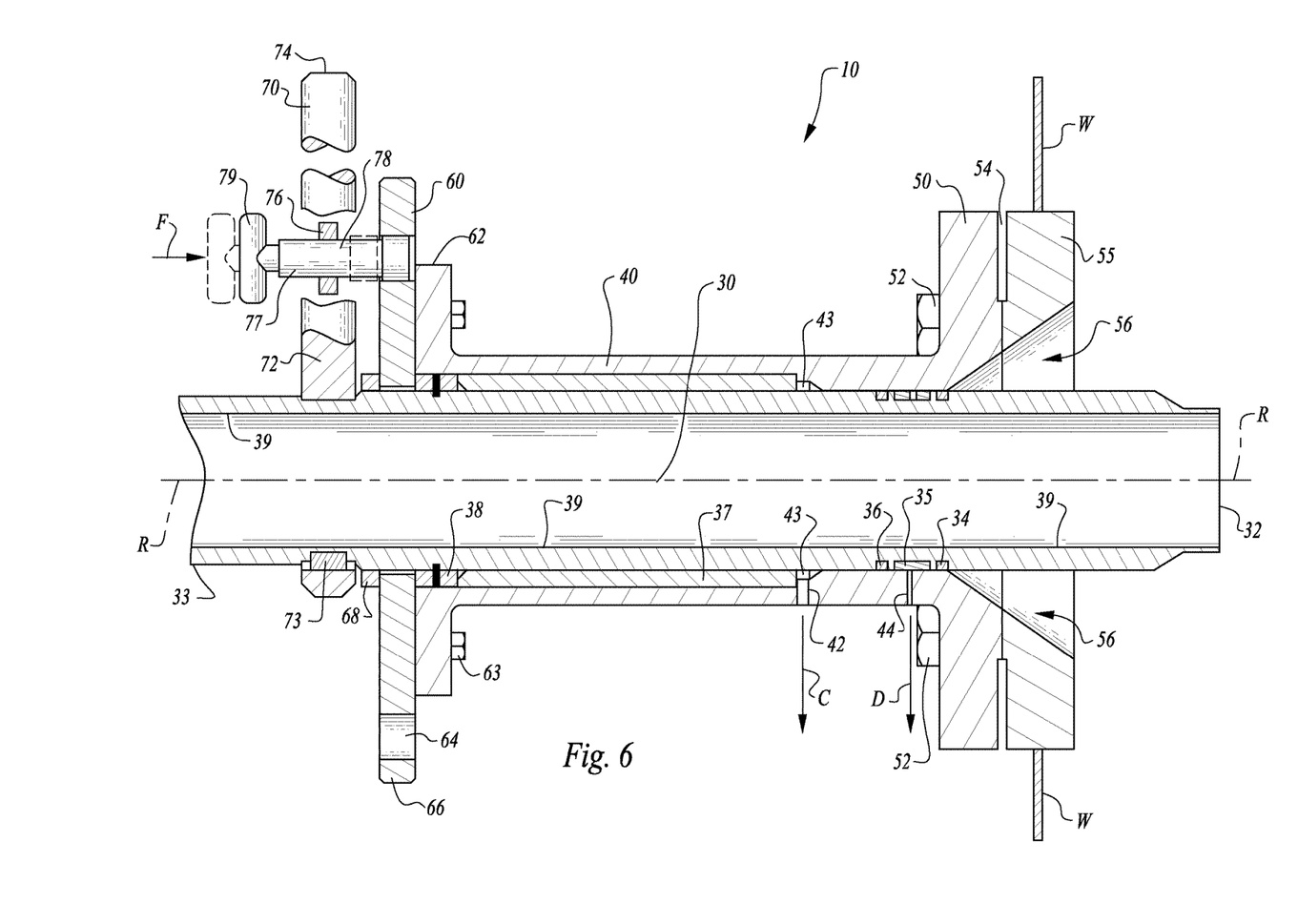
FIG. 6 is a side elevation full sectional view of housing and racking shaft portions of that which is shown in FIG. 4, along with an indexing plate and control arm of that which is shown in FIG. 4.

In essence, and with particular reference to FIGS. 3 and 4, basic details of the racking arm 10 of this invention are described, according to a preferred embodiment. The racking arm 10 includes an inlet pipe 20 which extends into an interior of the tank inboard of the tank wall W and which has a bend 24 so that a tip 22 defining an entrance of the inlet pipe 20 is offset from a rotational axis of the racking arm 10. The inlet pipe 20 connects to the racking shaft 30. The racking shaft 30 is an elongate hollow structure which extends along the rotational axis R (FIG. 6). The racking shaft 30 can rotate to cause the inlet pipe 20 to have its entrance repositioned at different elevations within the tank.

A housing 40 is fixed to the wall W of the tank and has a hollow cylindrical form supporting the racking shaft 30 rotationally therein. The housing 40 includes a face plate 50 which is affixed to the tank wall W, such as through a tank flange 55 welded to the tank wall W and with the face plate 50 bolted to the tank flange 55. An indexing plate 60 is located on a portion of the housing 40 opposite the face plate 50. A control arm 70 is affixed to the racking shaft 30 adjacent the indexing plate 60. The control arm 70 can be rotated to cause the racking shaft 30 to rotate. A pin 78 or other structure on the control arm 70 can engage pin holes 64 or other structures on the indexing plate 60 to hold the racking shaft 30 at a selected rotational orientation relative to the housing 40. A valve 80 is provided at a downstream end of the racking shaft 30 to open and close a pathway through the racking shaft 30 for discharge of fluids from the tank.

More specifically, and with particular reference to FIGS. 1-4, details of the inlet pipe 20 are described, according to this most preferred embodiment. The inlet pipe 20 is a hollow conduit extending from a tip 22 to an interconnection 26. A bend 24 is interposed between the tip 22 and the interconnection 26. Preferably, the inlet pipe 20 has a constant diameter extending from the tip 22 to the interconnection 26. The tip 22 defines an entrance into the inlet pipe 20. The bend 24 causes this entrance into the inlet pipe 20 to be spaced away from the rotational axis of the racking shaft 30 and the racking arm 10 overall assembly. In this way, the tip 22 and associated entrance can be located at different elevations within the tank by rotation of the racking shaft 30 and associated inlet pipe 20 relative to the housing 40 and associated tank wall W (along arrow G of FIGS. 1-3).

The interconnection 26 is affixed to the racking shaft 30, so that when the racking shaft 30 rotates the inlet pipe 20 also rotates. The inlet pipe 20 is preferably rigid and sufficiently high strength so that it can carry loads associated with being oriented in different rotational orientations about the rotational axis without appreciable bending or damage to the racking shaft 30. While the inlet pipe 20 is shown with a relatively gradual bend 24 of approximately 45° away from the rotational axis, this bend 24 can be more abrupt and potentially even bending at up to 90°, depending on the size of the tank and the preferences of the user. The inlet pipe 20 can be welded at the interconnection 26 to the racking shaft 30 or otherwise permanently affixed to the racking shaft 30.

With particular reference to FIGS. 3, 4, 6, 13 and 14, particular details of the racking shaft 30 are described according to this preferred embodiment. The racking shaft 30 is preferably an elongate rigid structure formed of a food grade material, such as stainless steel. The racking shaft 30 is preferably sufficiently rigid so that forces associated with having an inlet pipe 30 oriented in different ways inside the tank does not cause significant bearing loads to result in deformation of the racking shaft 30.

The racking shaft 30 extends in an elongate fashion from an inside end 32 to an outside end 33. The inside end 32 preferably extends into an interior of the tank and is coupled to the inlet pipe 20 at the interconnection 26, typically by affixation (e.g. welding). An interior wall 39 of the racking shaft 30 is preferably smooth and aligned with an interior of the inlet pipe 20 so that a smooth pathway for fluids being discharged from the tank is provided through the racking shaft 30. The racking shaft 30 preferably has a length greater than a length of the housing 40 so that the inside end 32 extends into an interior of the tank and the outside end 33 extends past other portions of the housing 40.

Figure 13:
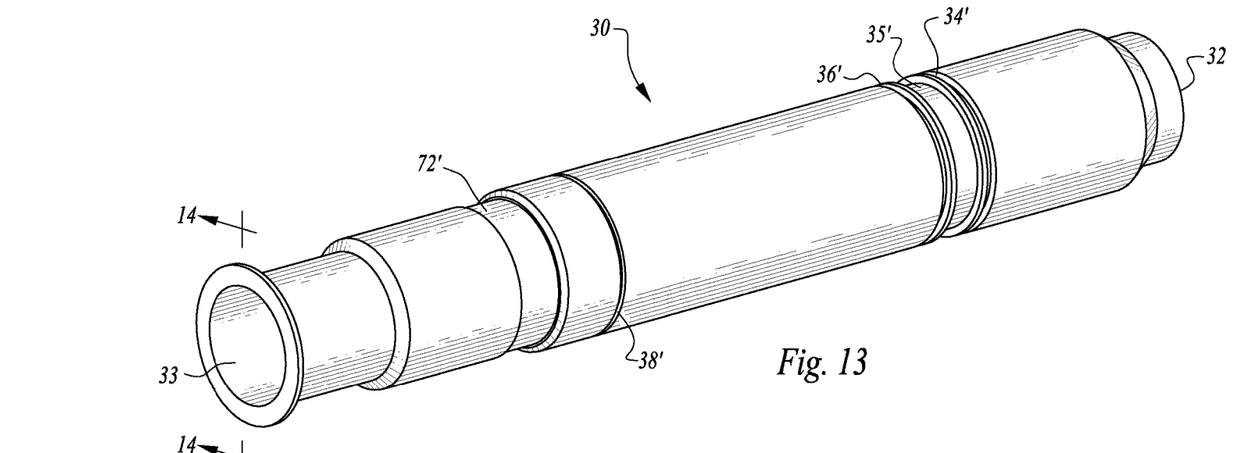
FIG. 13 is a perspective view of the racking shaft portion of the racking arm of this invention according to the embodiment of FIG. 3.
Figure 14:
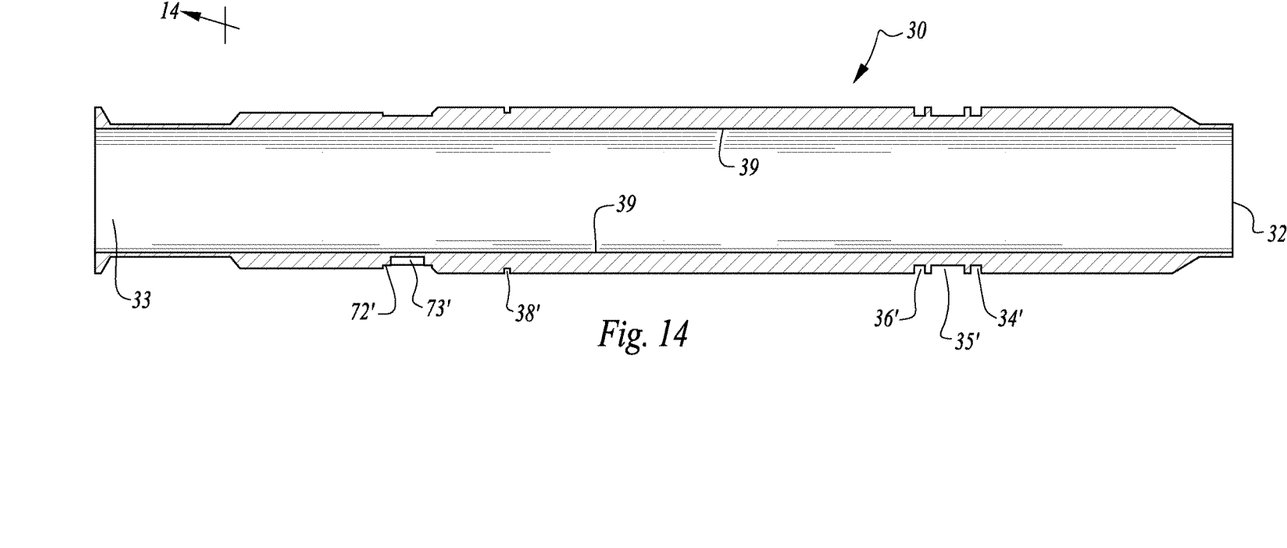
FIG. 14 is a sectional view taken along line 14-14 of FIG. 13.
Figures 15, 16:
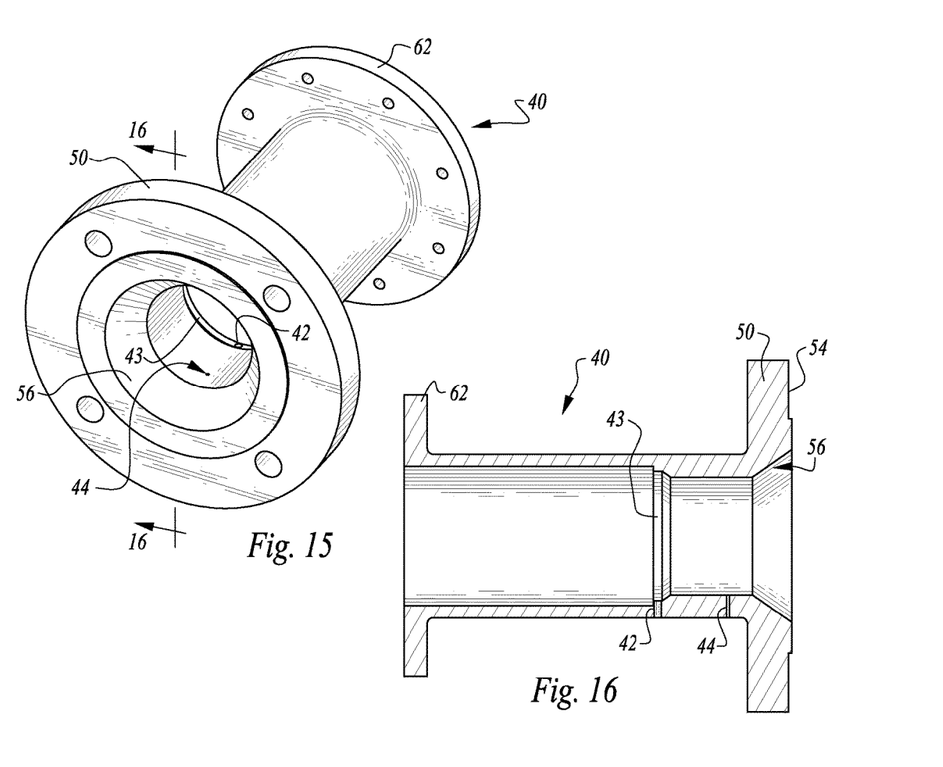
FIG. 15 is a perspective view of the housing of the racking arm of this invention according to the embodiment of FIG. 3.
FIG. 16 is a full sectional view taken along line 16-16 of FIG. 15.

The racking shaft 30 has an outside surface which preferably is formed with various radial grooves therein to support various seals, bearings and other structures. A first groove 34' is provided to support a first seal 34. A ring bearing groove 35' is provided to support a ring bearing 35. A second seal groove 36' is provided to support a second seal 36. A ring bearing groove 38' is provided to support a ring bearing 38. A collar groove 72' is provided to support portions of a collar 72 associated with the control arm 70. A keyhole 73' is provided to support a key 73 associated with the control arm 70. With the exception of the keyhole 73', each of these details on the exterior of the racking shaft 30 preferably extend circumferentially about the racking shaft 30.

Figure 9:
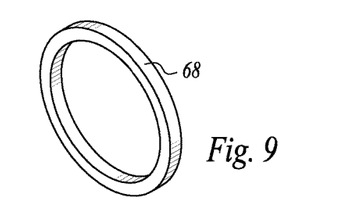
FIG. 9 is a perspective view of a bushing of the racking arm of this invention, as shown in the embodiment of FIG. 3.
Figure 10:
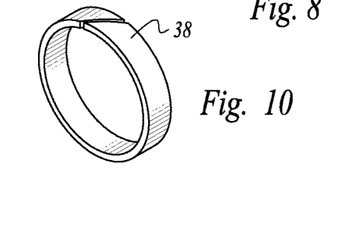
FIG. 10 is a perspective view of a retaining ring of the racking arm according to this invention, and as depicted in FIG. 3.
Figure 11:
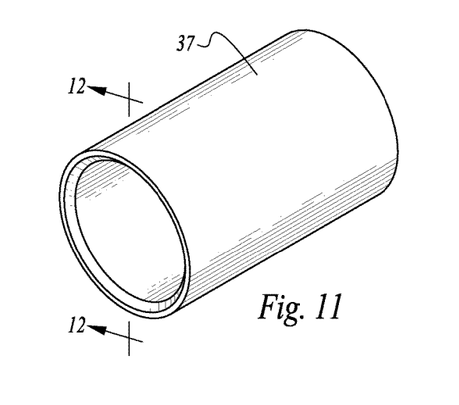
FIG. 11 is a perspective view of a sleeve bearing of the racking arm of this invention according to the embodiment of FIG. 3.
Figure 12:
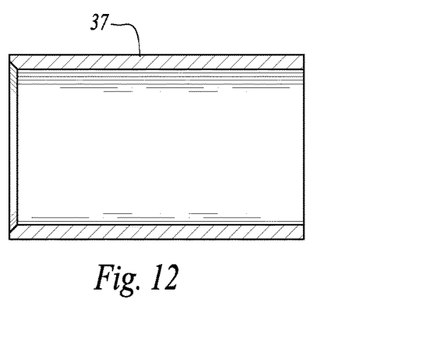
FIG. 12 is a sectional view taken along line 12-12 of FIG. 11.

The racking shaft 30 is held in a centered location through the housing 40 and aligned with the rotational axis R of the racking arm 10 by at least two bearings including the ring bearing 35 and a sleeve bearing 37. The first seal 34 and second seal 36 are provided on either side of the ring bearing 35. These seals 34, 36 are preferably formed of a resilient material which is deflected somewhat and has a friction fit against the housing 40 to prevent fluids from passing between the racking shaft 30 and the housing 40. The ring bearing 35 preferably has a size sufficient to cause portions of the ring bearing 35 to extend slightly more radially than an outer wall of the racking shaft 30 so that loads of the racking shaft 30 rotating within the housing 40 are preferably primarily carried by the ring bearing 35 and by the sleeve bearing 37, rather than the material forming the racking shaft 30 itself. The ring bearing 38 is a removable structure which keeps the racking shaft 30 from translating linearly within the housing 40 and acts as a further bearing for the racking shaft 30. This retaining ring 38 can have a form such as that depicted in FIG. 10. A bushing 68 (FIG. 9) also helps to keep the racking shaft 30 in position along the rotational axis, and from translating linearly out of the housing 40.

With particular reference to FIGS. 3, 4, 6, 15 and 16, details of the housing 40 are described, according to this preferred embodiment. The housing 40 is a rigid structure which is fixed to the tank wall W and does not rotate with other portions of the racking arm 10. The housing 40 preferably has an elongate hollow inside through which the racking shaft 30 extends. The housing 40 preferably includes both a secondary leak detection port 42 and a primary leak detection port 44 extending from an inside surface of the housing 40 to an outside surface of the housing 40.

Preferably, the secondary leak detection port 42 is aligned with an annular groove 43 in the inside surface of the housing 40. If liquid bypasses the seals 34, 36 it will be collected by this annular groove 43 and extend down to the underside of the housing 40 where the secondary leak detection port 42 is located. Fluid will then drip (or otherwise flow) out of this leak detection port 42 (along arrow C of FIGS. 3, 4 and 6). When such fluid is flowing, this indicates that the seals 34, 36 have failed and fluids are leaking out of the tank. If desired, a plug can be removably placed over the secondary leak detection port 42.

Preferably, a primary leak detection port 44 is also provided extending through the housing 40. This primary leak detection port 44 preferably extends from an inside location between the first seal 34 and the second seal 36 and then extends out of the outside wall of the housing 40. This primary leak detection port 44, when it is leaking (along arrow D of FIGS. 3,4 and 6), indicates that it is the first seal 34 which has failed. The primary leak detection port 44 preferably has a plug which can be fitted into the primary leak detection port 44, such as to facilitate verification of whether or not the second seal 36 has failed.

Both the secondary leak detection port 42 and primary leak detection port 44 are preferably located on a lower side of the housing 40 to be at the location where fluid is most likely to collect if it has leaked past the seals 34, 36. While the leak detection ports 42, 44 are shown extending radially away from the rotational axis of the racking arm 10, the leak detection ports 42, 44 could extend at an angle diverging from that depicted in FIG. 6.

Figure 17:
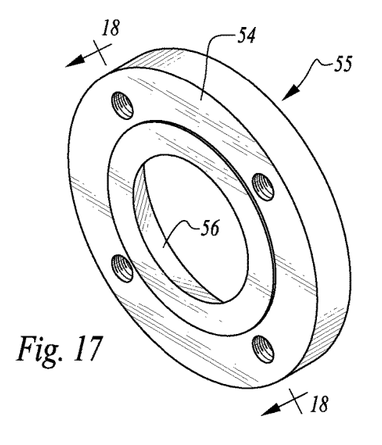
FIG. 17 is a perspective view of a tank flange of the racking arm of this invention according to the embodiment of FIG. 3.
Figure 18:
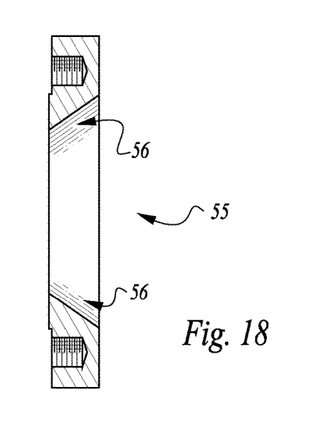
FIG. 18 is a full sectional view taken along line 18-18 of FIG. 17.

The housing 40 includes a face plate 50 on a side of the housing 40 to be coupled to the tank wall W through a tank flange 55. The face plate 50 is preferably provided separate from the tank flange 55 (see FIGS. 17 and 18) having a similar size and shape. The tank flange 55 can be welded to the tank wall W or otherwise affixed to the tank wall W. Bolts 52 can pass through the face plate 50 and into threaded blind bores in the tank flange 55 to secure the face plate 50 and associated housing 40 to the tank flange 55. While four bolts are shown, other numbers of bolts can be provided, with eight bolts often being preferred. In this way, the housing 40 is securely and fixedly attached to the tank wall W. A gasket space 54 is preferably provided between the face plate 50 and tank flange 55 to allow space for a gasket for sealing of the face plate 50 and tank flange 55 and to prevent leaking therebetween.

A clearance groove 56 (FIGS. 3, 4 and 6) extends through at least portions of the tank flange 55 and preferably through both the tank flange 55 and portions of the face plate 50. This clearance groove 56 allows for portions of the racking shaft 30 adjacent the first seal 34 to be effectively cleaned and sanitized from within an interior of the tank. Preferably this clearance groove 56 has a frusto-conical shape with a constant taper so that the clearance groove 56 is larger as it extends towards a center of the tank. This angle of taper is preferably between about 30° and about 60° and in one embodiment measures about 35°. The angle of taper is preferably continuous between the separate tank flange 55 and face plate 50. As an alternative, the face plate 50 or other end flange could be directly affixed to the wall of the tank, such as by welding or otherwise affixed to the tank.

Figure 7:
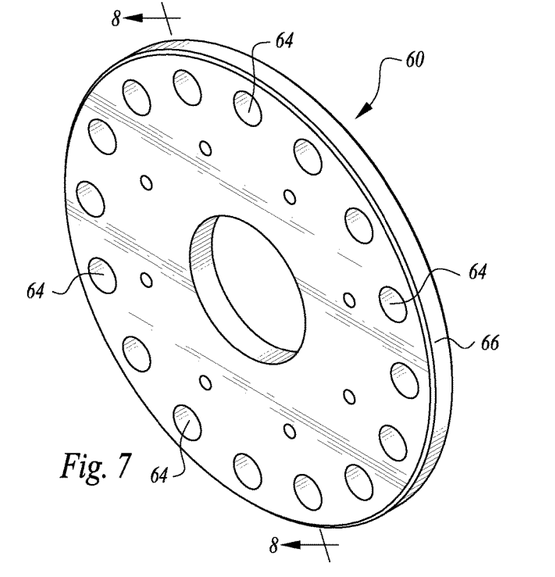
FIG. 7 is a perspective view of the indexing plate of the racking arm of this invention according to the embodiment of FIGS. 1-3.
Figure 8:
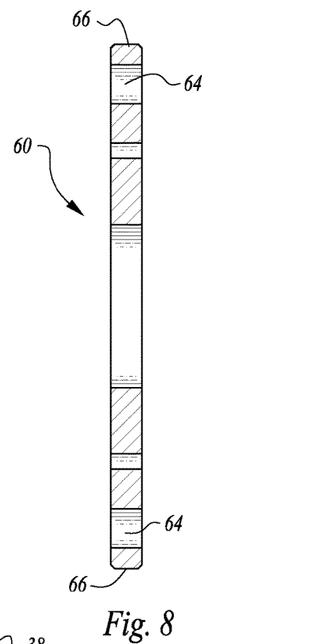
FIG. 8 is a full sectional view taken along line 8-8 of FIG. 7, showing the indexing plate.

An indexing plate 60 is provided on an end of the housing 40 opposite the face plate 50. In particular, the housing 40 is preferably formed as a unitary mass, such as by casting, or by machining, to include the face plate 50 and to also include an end plate 62 opposite the face plate 50. The indexing plate 60 is bolted to the end plate 62 in such an embodiment through bolts 63, or otherwise fastened to the end plate 62. The indexing plate 60 extends radially out to a peripheral edge 66. Pin holes 64 extend through the indexing plate 60 along lines generally parallel with the rotational axis of the racking arm 10. In the embodiment shown, sixteen separate pin holes 64 are provided. The indexing plate 60, because it is affixed to the end plate 62 of the housing 40, remains fixed in position relative to the tank wall W.

With particular reference to FIGS. 1-4 and 6, details of the control arm 70 are described, according to this most preferred embodiment. The control arm 70 is an elongate rigid structure preferably extending generally perpendicular to the rotational axis R of the racking arm from a collar 72 to a free end 74. The collar 72 preferably surrounds the racking shaft 30 adjacent the outside end 33. A key 73 interfaces between the collar 72 and the racking shaft 30 so that the control arm 70 is prevented from rotating relative to the racking shaft 30. Rather, when the control arm 70 is rotated (along arrow E) the racking shaft 30 is also caused to be rotated so that the inlet pipe 20 is also caused to be rotated (along arrow G of FIGS. 1-3).

The control arm 70 preferably includes a side bar 76 extending laterally therefrom which supports a slide tube 77.

A pin 78 can slide within this slide tube 77 with a knob 79 on one end of the pin 78 and an end of the pin 78 opposite the knob 79 sized to fit into one of the pin holes 64 in the indexing plate 60. Preferably, the slide tube 77 includes a spring therein which acts on the pin 78 so that the pin 78 is biased toward a position extending into one of the pin holes 64 of the indexing plate 60 (along arrow F of FIGS. 3, 4 and 6). A force can be applied to the knob 79 to remove the pin 78 from one of the pin holes 64, but otherwise the pin 78 will reside within one of the pin holes 64 or against a surface of the indexing plate 60. Importantly, the control arm 70 preferably extends linearly to the free end 74 and has an orientation relative to the racking shaft 30 which substantially corresponds with an orientation of the inlet pipe 20 relative to the racking shaft 30, so that the control arm 70 remains substantially radially aligned with the entrance of the inlet pipe 20. In this way, when the control arm 70 is rotated an operator can clearly see by viewing the control arm 70 orientation what the orientation of the inlet pipe 20 is within the tank, even though the tank is typically formed with the tank wall W of opaque material so that the inlet pipe 20 cannot be directly viewed. An operator thus has confidence as to which elevation within the tank is being drawn when fluid is outputted through the racking arm 10 from the tank.

Figure 5:
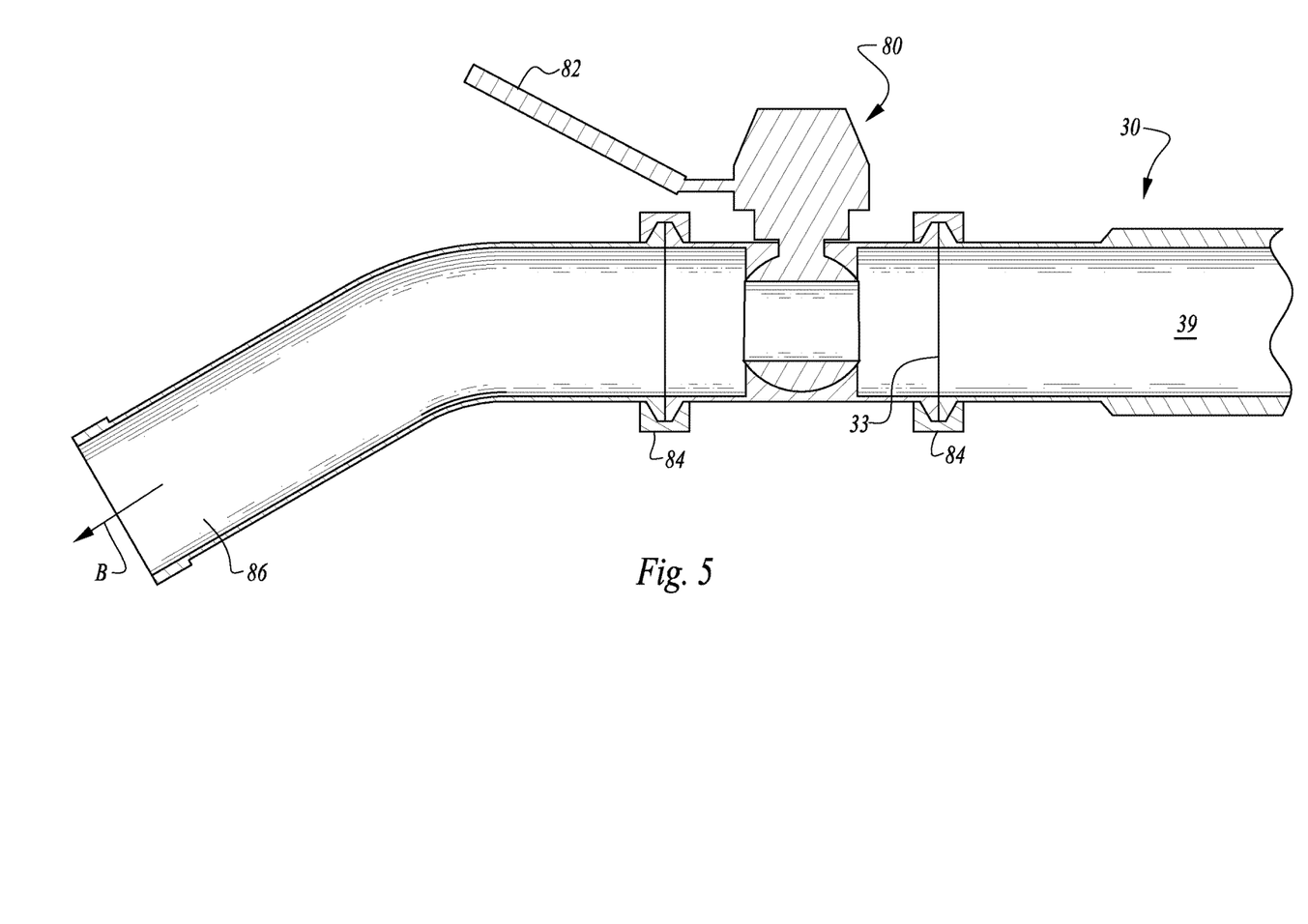
FIG. 5 is a side elevation full sectional view of a valve portion of that which is shown in FIG. 4, with clamps that preferably include one swivel joint.

A valve 80 is preferably provided on an end of the racking arm 10 opposite the tank. This valve 80 can have any of a variety of configurations, with a ball valve depicted in FIG. 5 according to one embodiment of this invention. This valve 80 includes a handle 82 for actuation of the valve 80. Couplings 84 are provided on ends of the valve 80 for attachment to the outside end 33 of the racking shaft 30 and an outlet tube 86 downstream of the valve 80. This outlet tube 86 preferably includes a bend also and can have a swivel coupling on an end thereof, such as for connection to hoses or other piping in a removable fashion. One of the couplings 84 could be configured as such a swivel coupling, or a swivel joint separate from the couplings 84 can be provided.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A racking arm tank outlet, comprising in combination:
a housing having a substantially cylindrical hollow inside;
said housing having at least one flange at an end thereof, said at least one flange coupled to a side wall of a tank;
a racking shaft extending through said hollow inside of said housing, said racking shaft itself having a hollow interior extending between an inside end and an outside end, said inside end closer to a center of the tank than said outside end, said racking shaft rotatable relative to said housing about a rotational axis of said racking shaft;
an inlet pipe coupled to said inside end of said racking shaft, said inlet pipe having an entrance offset from said rotational axis of said racking shaft; and
a clearance groove adjacent said racking shaft and at least partially within said at least one flange of said housing, said clearance groove defining an open space outside of and adjacent to said racking shaft.

2. The racking arm tank outlet of claim 1 wherein said at least one flange includes a face plate and a tank flange, said face plate and said tank flange located adjacent each other and secured together, said housing coupled to the side wall of the tank through said tank flange, said clearance groove located at least partially within said tank flange.

3. The racking arm tank outlet of claim 2 wherein said clearance groove is located within both said face plate and said tank flange.

4. The racking arm tank outlet of claim 2 wherein said clearance groove is located only in said tank flange and not in said face plate.

5. The racking arm tank outlet of claim 2 wherein said tank flange is welded to the side wall of the tank, and with said face plate removably attached to said tank flange.

6. The racking arm tank outlet of claim 1 wherein said clearance groove exhibits a taper with said clearance groove wider as said clearance groove extends toward a center of the tank.

7. The racking arm tank outlet of claim 6 wherein said clearance groove exhibits a frusto-conical shape as it tapers toward the center of the tank.

8. The racking arm tank outlet of claim 7 wherein said clearance groove exhibits a substantially constant angle away from said rotational axis of said racking shaft measuring between about 30° and about 60°.

9. The racking arm tank outlet of claim 1 wherein at least one seal is interposed between said racking shaft and said hollow inside of said housing; and
wherein a leak detection port extends out of said hollow inside of said housing along a line non-parallel with said rotational axis of said racking shaft to form a leak detection port which is open to allow fluid passage therethrough when fluid migrates past said at least one seal to a side of said at least on seal opposite said clearance groove.

10. The racking arm tank outlet of claim 9 wherein at least two seals are located between said hollow inside of said housing and said racking shaft with a bearing interposed between said at least two seals; and
wherein at least two leak detection ports pass through said housing from said hollow inside along separate paths non-parallel with said rotational axis of said racking shaft, said at least two leak detection ports having different locations adjacent said hollow inside of said housing, and with at least one of said leak detection ports located between said at least two seals, and at least one of said leak detection ports located on a side of both of said at least two seals opposite said clearance groove, such that an operator can view the two leak detection ports and discern which of the at least two seals has failed.

11. The racking arm tank outlet of claim 1 wherein an arm is fixedly coupled to said racking shaft and extending non-parallel relative to said rotational axis of said racking shaft, said arm substantially aligned radially with said entrance of said inlet pipe, such that an orientation of said arm corresponds with an orientation of said inlet pipe.

12. A racking arm tank outlet device, comprising in combination:
- a housing having a substantially cylindrical hollow inside surface spaced by a wall thickness from an outside surface;
- said housing having at least one flange at an end thereof, said flange coupled to a side wall of a tank;
- a racking shaft extending inboard of said hollow inside surface of said housing, said racking shaft itself having a hollow interior extending between an inside end and an outside end, said inside end closer to a center of the tank than said outside end, said racking shaft rotatable relative to said housing about a rotational axis of said racking shaft;
- an inlet pipe coupled to said inside end of said racking shaft, said inlet pipe having an entrance offset from said rotational axis of said racking shaft; and
- at least one leak detection port extending from said inside surface of said housing through said outside surface of said housing, such that if any fluid is leaking into space between said housing and said racking shaft, such fluid will flow through said leak detection port.

13. The device of claim 12 wherein at least one seal is interposed between said inside surface of said housing and said racking shaft, said leak detection port interfacing with said hollow inside surface of said housing on a side of said at least one seal opposite the center of the tank.

14. The device of claim 13 wherein at least two seals are interposed between said hollow inside surface of said housing and said racking shaft with said seals located differing distances away from the center of the tank, at least two leak detection ports located extending from said hollow inside surface of said housing through said outside surface of said housing, said at least two leak detection ports having ends adjacent said hollow inside surface located on differing sides on one of said at least two seals with each of said leak detection ports located on a side of at least one of said seals opposite the center of the tank.

15. The device of claim 14 wherein a bearing is interposed between said at least two seals and between said inside surface of said housing and said racking shaft.

16. The device of claim 13 wherein an annular groove is formed in said inside surface of said housing aligned with said leak detection port.

17. The device of claim 13 wherein a clearance groove is located adjacent said racking shaft and at least partially within said at least one flange of said housing, said clearance groove defining an open space outside of and adjacent to said racking shaft, said clearance groove accessible from within the tank, such as for cleaning of said racking shaft.

18. The device of claim 17 wherein said clearance groove exhibits a taper with said clearance groove wider as said clearance groove extends toward a center of the tank;
- wherein said clearance groove exhibits a frusto-conical shape as it tapers toward the center of the tank; and
- wherein said clearance groove exhibits a substantially constant angle away from said rotational axis of said racking shaft measuring between about 30° and about 60°.

19. The device of claim 12 wherein an arm is fixedly coupled to said racking shaft and extending non-parallel relative to said rotational axis of said racking shaft, said arm substantially aligned radially with said entrance of said inlet pipe, such that an orientation of said arm corresponds with an orientation of said inlet pipe.

20. A racking arm tank outlet with orientation indicator, comprising in combination:
- a housing having a substantially cylindrical hollow inside;
- said housing having at least one flange at an end thereof, said at least one flange coupled to a side wall of a tank;
- a racking shaft extending through said hollow inside of said housing, said racking shaft itself having a hollow interior extending between an inside end and an outside end, said inside end closer to a center of the tank than said outside end, said racking shaft rotatable relative to said housing about a rotational axis of said racking shaft;
- an inlet pipe coupled to said inside end of said racking shaft, said inlet pipe having an entrance offset from said rotational axis of said racking shaft; and
- wherein an arm is fixedly coupled to said racking shaft and extending non-parallel relative to said rotational axis of said racking shaft, said arm substantially aligned radially with said entrance of said inlet pipe, such that an orientation of said arm corresponds with an orientation of said inlet pipe.

21. The outlet of claim 20 wherein an indexing plate is affixed to said housing on an end of said housing opposite said at least one flange, said indexing plate extending radially away from said rotational axis of said racking shaft, said arm configured to removably engage said indexing plate to hold said racking shaft and said inlet pipe in fixed position relative to said housing and the side wall of the tank.

22. The outlet of claim 21 wherein said indexing plate includes a plurality of holes passing therethrough in a substantially radially symmetrical manner, and wherein a pin is coupled to said arm and adapted to translate linearly relative to said arm and toward and away from said plate, said pin sized to fit within said holes in said indexing plate, such that when said pin is placed within one of said holes, said racking shaft is fixed relative to said housing, and when said pin is outside of said holes in said indexing plate, said arm can be rotated about said rotational axis of said racking shaft to cause said racking shaft and said inlet pipe to rotate relative to said housing and the side wall of the tank.

23. The outlet of claim 20 wherein a clearance groove is provided adjacent said racking shaft and at least partially within said at least one flange of said housing, said clearance groove defining an open space outside of and adjacent to said racking shaft.

24. The outlet of claim 20 wherein at least one leak detection port is provided extending from said inside surface of said housing through to an outside surface of said housing, such that if any fluid is leaking into space between said housing and said racking shaft, such fluid will flow through said leak detection port.

* * * * *